United States Patent
Kato et al.

(10) Patent No.: US 10,670,518 B2
(45) Date of Patent: Jun. 2, 2020

(54) FOURIER TRANSFORM INFRARED SPECTROPHOTOMETER

(71) Applicant: SHIMADZU CORPORATION, Kyoto-shi, Kyoto (JP)

(72) Inventors: Daijiro Kato, Kyoto (JP); Shinya Wakuda, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 26 days.

(21) Appl. No.: 16/028,531

(22) Filed: Jul. 6, 2018

(65) Prior Publication Data

US 2019/0011357 A1 Jan. 10, 2019

(30) Foreign Application Priority Data

Jul. 7, 2017 (JP) ................................. 2017-133439

(51) Int. Cl.
  *G01N 21/35* (2014.01)
  *G01J 3/45* (2006.01)
  (Continued)

(52) U.S. Cl.
  CPC ................ *G01N 21/35* (2013.01); *G01J 3/28* (2013.01); *G01J 3/45* (2013.01); *G01J 3/4535* (2013.01);
  (Continued)

(58) Field of Classification Search
  CPC ......... G01B 11/0641; G01J 3/453; G01J 3/45; G01N 29/40; G01N 21/35
  See application file for complete search history.

(56) References Cited

U.S. PATENT DOCUMENTS

2003/0007155 A1 1/2003 Ota
2007/0197168 A1 8/2007 Amanuma et al.

FOREIGN PATENT DOCUMENTS

JP 63-44131 A 2/1988
JP 2002-022536 A 1/2002
(Continued)

OTHER PUBLICATIONS

J.M. Preses et al., "Fourier-transform spectrophotometer for time-resolved emission measurements using a 100-point transient digitizer", Review of Scientific Instruments, Jan. 1993, vol. 64, No. 1, XP000330731, pp. 95-102 (total 8 pages).
(Continued)

*Primary Examiner* — Kenneth J Malkowski
(74) *Attorney, Agent, or Firm* — Sughrue Mion, PLLC (57) ABSTRACT

The Fourier transform infrared spectrophotometer includes: a light source 11 for generating infrared light having a wavelength width including an absorption wavelength of a compound to be analyzed; an interferometer including a fixed mirror 15 and a movable mirror 16, for generating interfering light from the infrared light; a detector 25 for generating a voltage with a magnitude corresponding to the intensity of the interfering light, and for outputting a voltage obtained by subtracting, from the aforementioned voltage, a voltage with a predetermined magnitude; a high-pass filter 464 for allowing the passage of frequency components equal to or higher than a predetermined frequency in an output voltage from the detector 25; an amplifier 463 for amplifying an output voltage from the high-pass filter 464 by a predetermined multiplying factor; and an analogue-to-digital converter 27 for converting an output voltage from the amplifier 463 into a digital signal.

3 Claims, 6 Drawing Sheets

(51) Int. Cl.
*G01J 3/28* (2006.01)
*G01J 3/453* (2006.01)
(52) U.S. Cl.
CPC ................. *G01J 2003/4538* (2013.01); *G01N 2021/3595* (2013.01)

(56) References Cited

FOREIGN PATENT DOCUMENTS

| JP | 2003-014543 A | 1/2003 |
|---|---|---|
| JP | 2007-205793 A | 8/2007 |
| JP | 2012-007964 A | 1/2012 |

OTHER PUBLICATIONS

Communication dated Dec. 4, 2018 from the European Patent Office in counterpart Application No. 18182122.4.

PRIOR ART

FOURIER TRANSFORM INFRARED SPECTROPHOTOMETER

TECHNICAL FIELD

The present invention relates to a Fourier transform infrared spectrophotometer (FTIR).

BACKGROUND ART

Figure 1:
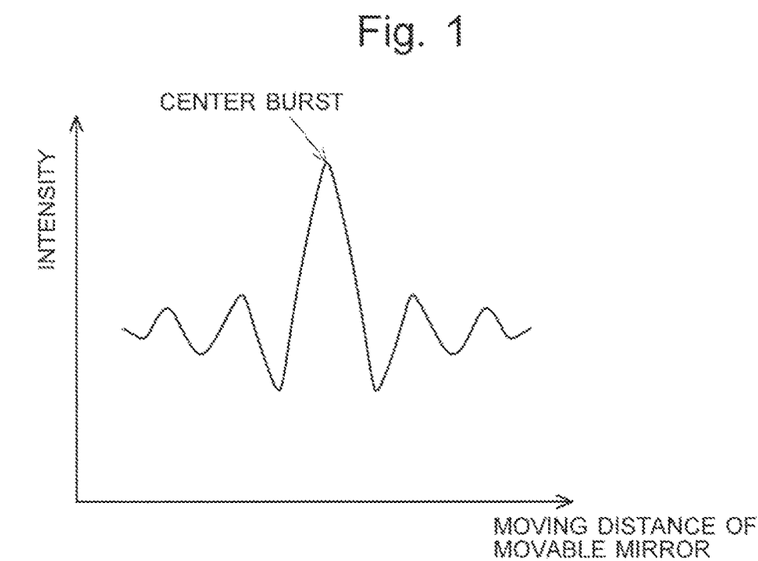
FIG. 1 is an example of an interferogram obtained with a Fourier transform infrared spectrophotometer.

In Fourier transform infrared spectroscopy, an interferometer which includes a beam splitter, fixed mirror and movable mirror is used, such as a Michelson's interferometer. In an interferometer, the position of the movable mirror is changed to change the optical length difference between a beam of light reflected by this movable mirror and a beam of light reflected by the fixed mirror, and thereby generate varying interfering light in which the two aforementioned beams of light interfere with each other having a phase difference which varies depending on the optical length difference. Infrared light having a wavelength width including an absorption wavelength of a target compound contained in a sample is introduced into the interferometer to generate interfering light. This light is cast into the sample, and the intensity of the transmitted light is measured. Such a sequence of operations is repeatedly performed while gradually changing the position of the movable mirror. As a result, an interferogram which shows the change in the intensity of the transmitted light with respect to the moving distance of the movable mirror is obtained (FIG. 1). By Fourier-transforming this interferogram, a power spectrum with the vertical axis indicating the intensity and the horizontal axis indicating the wavenumber can be obtained (for example, see Patent Literature 1, 2 or 3).

Figure 2:
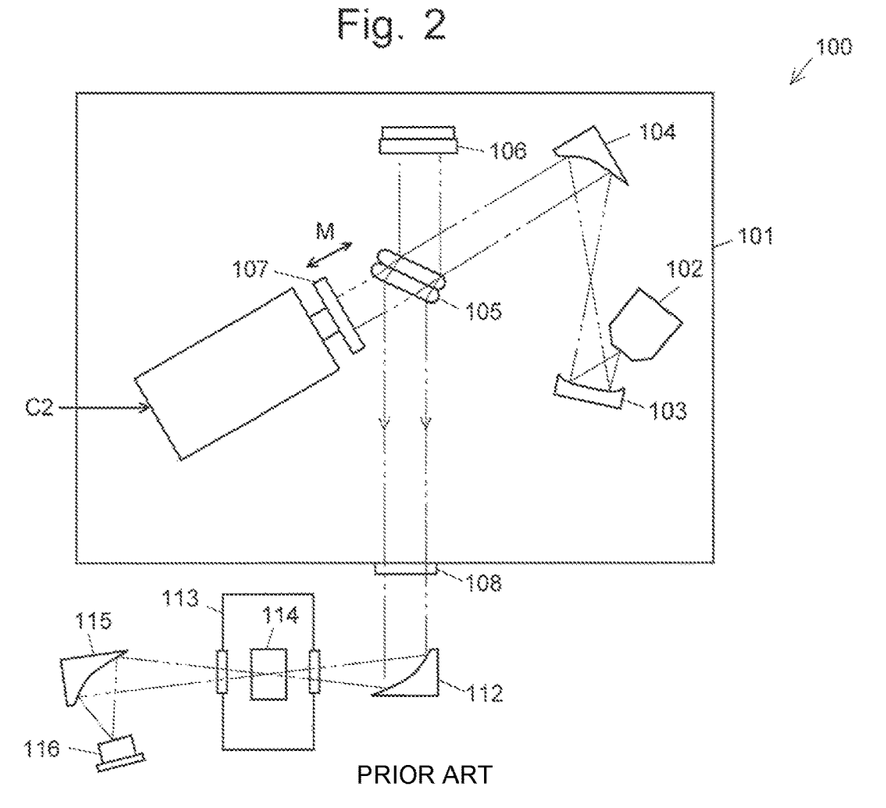
FIG. 2 is a configuration diagram of the main components of a conventional Fourier transform infrared spectrophotometer.

FIG. 2 shows the configuration of the main components of a conventionally used Fourier transform infrared spectrophotometer. The Fourier transform infrared spectrophotometer 100 is roughly composed of two sections: an interference section located within an airtight chamber 101 and a measurement section located outside the airtight chamber 101. The interference section includes a light source 102, condensing mirror 103, collimating mirror 104, beam splitter 105, fixed mirror 106, and movable mirror 107. The measurement section includes a parabolic mirror 112, sample chamber 113, ellipsoidal mirror 115, and detector 116. A sample 114 is placed within the sample chamber 113.

Infrared light emitted from the light source 102 is cast onto the beam splitter 105 via the condensing mirror 103 and the collimating mirror 104. The beam splitter 105 splits the light into two beams travelling toward the fixed and movable mirrors 106 and 107, respectively. The infrared beams respectively reflected by the fixed and movable mirrors 106 and 107 return to the bean splitter 105 and are merged into a single beam. This beam exits from the window 108 of the airtight chamber 101 and travels toward the parabolic mirror 112. Being condensed by the parabolic mirror 112, the beam is cast into the sample 114 inside the sample chamber 113. After passing through the sample 114, the beam is focused onto the detection surface of the detector 116 by the ellipsoidal mirror 115 and detected. Driving the movable mirror 107 back and forth (in the direction indicated by arrow M in FIG. 2) causes a change in the optical length difference between the infrared light reflected by the fixed mirror 106 and the infrared light reflected by the movable mirror 107. As a result, the two beams of infrared light interfere with each other having a phase difference which changes depending on the optical length difference. The interfering infrared light transmitted through the sample 114 is detected by the detector 116.

Figure 3:
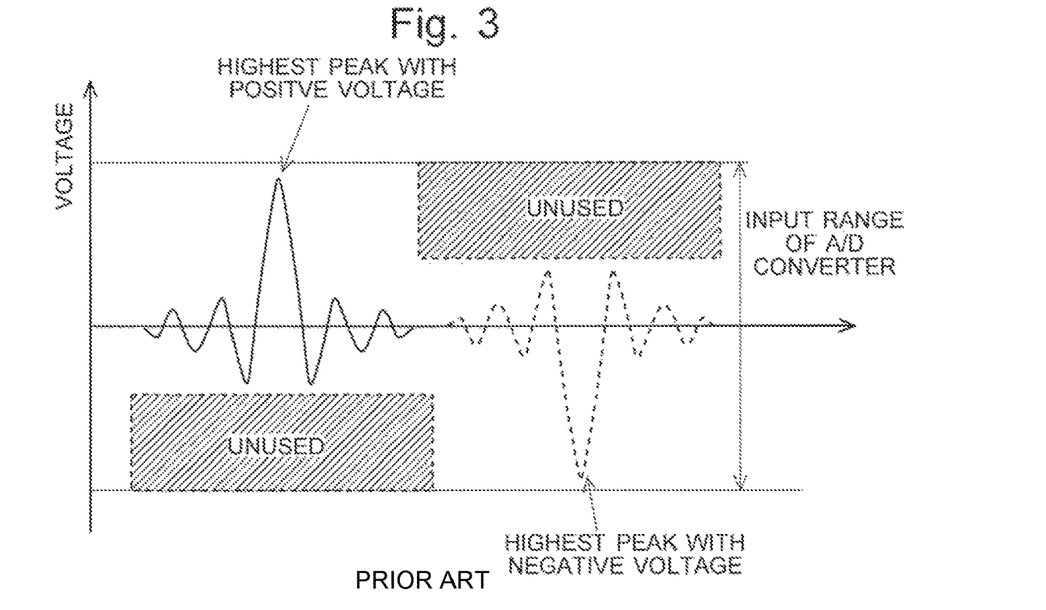
FIG. 3 is a diagram illustrating the relationship between the subtracted waveform and the input range of the A/D converter in a conventional Fourier transform infrared spectrophotometer.

An example of the detector 116 is a pyroelectric detector having a pyroelectric element and junction field-effect transistor. The pyroelectric element generates electric charges in an amount corresponding to the amount of incident infrared light and generates an electric current. The pyroelectric element is connected to the gate of the junction field-effect transistor, while a resistor is connected to the source of the same transistor. Upon incidence of infrared light, a change in voltage occurs at the gate to which the pyroelectric element is connected, causing a change in the amount of electric current flowing out of the source. This in turn changes the potential difference between the two ends of the resistor connected to the source. By measuring this potential difference, a voltage value which corresponds to the amount of incident infrared light can be obtained. When there is no incident infrared light, a voltage which corresponds to the leakage current from the drain to the gate and the resistance of the pyroelectric element is applied to the gate. This means that an offset voltage is constantly generated between the two ends of the resistor. The pyroelectric detector produces an output voltage having a positive or negative value which represents a change from this offset voltage (see the waveform indicated by the solid line in FIG. 3). For distinction from the interferogram shown in FIG. 1, the waveform shown in FIG. 3 is hereinafter called the "subtracted waveform".

CITATION LIST

Patent Literature

Patent Literature 1: JP 2012-7964 A
Patent Literature 2: JP 2002-22536 A
Patent Literature 3: JP 2003-14543 A
Patent Literature 4: JP 2007-205793 A

SUMMARY OF INVENTION

Technical Problem

In the Fourier transform infrared spectrophotometer, the optical length of the infrared light reflected by the movable mirror 107 is equal to that of the light reflected by the fixed mirror 106 when the movable mirror 107 is located at a specific position. In this state, the two reflected beams merged with each other at the beam splitter 105 are in phase at all wavelengths and strengthen each other, so that the infrared light with the highest intensity is detected. A peak which corresponds to this state on the interferogram is called the "center burst" (see FIG. 1). This center burst corresponds to the highest peak which appears on the positive voltage side of the subtracted waveform indicated by the solid line in FIG. 3. When the movable mirror 107 is shifted from the specific position, an optical length difference occurs between the two reflected beams, causing the two reflected beams to interfere with each other with a different phase difference at each wavelength. Therefore, with the gradual shift of the movable mirror, the intensity of the detected infrared light changes in a ripple-like form.

However, actual measurements have the following problem due to the use of the beam splitter 105: The beam splitter consists of a pair of window members on which a thin layer of germanium (Ge) or similar material is deposited. When infrared light passes through the window members, each component of light is reflected with a different index of refraction depending on the wavelength. Furthermore, the pair of window members are not uniform in thickness in the strict sense. Due to these factors, the two reflected beams of infrared light cannot be simultaneously in phase at all wavelengths. In some cases, the opposite situation occurs; i.e. the two reflected beams may have a phase difference of r at many wavelengths and weaken each other, causing the highest peak to appear in a downward-pointing form (i.e. the highest peak may appear on the negative voltage side). Even with the same apparatus, when a sample is placed inside, the highest peak can appear on either the positive or negative voltage side depending on the wavelength at which the strongest absorption by the sample occurs. When no sample is present, the peak pattern is always the same. Therefore, the height and direction (positive/negative) of the highest peak originating from the apparatus itself can be predicted to some extent for each individual apparatus. However, when a sample is present, it is impossible to predict which of the positive and negative voltage peaks will appear.

As just noted, it is impossible to predict whether the highest peak with a positive voltage or one with a negative voltage will appear. Accordingly, the amplification factor of the amplifier is set so that the peak will certainly fall within the input range of the analogue-to-digital (A/D) converter, whichever of the two kinds of peaks appears. However, in an actual measurement, the highest peak only appears on either the positive voltage side or negative voltage side. If the highest peak appears on the positive voltage side as in the subtracted waveform indicated by the solid line in FIG. 3, a considerable portion of the input range on the negative voltage side remains unused. Conversely, if the highest peak appears on the negative voltage side as in the subtracted waveform indicated by the dashed line, a considerable portion of the input range on the positive voltage side remains unused. In any case, the input range of the A/D converter cannot be fully used.

The problem to be solved by the present invention is to provide a Fourier transform infrared spectrophotometer which can efficiently use the input range of the A/D converter regardless of whether the highest peak with a positive voltage or one with a negative voltage appears.

Solution to Problem

A Fourier transform infrared spectrophotometer according to the first aspect of the present invention developed for solving the previously described problem includes:

a) a light source for generating infrared light having a wavelength width including an absorption wavelength of a compound to be analyzed;

b) an interferometer including a fixed mirror and a movable mirror, for generating interfering light from the infrared light;

c) a detector for generating a voltage with a magnitude corresponding to the intensity of the interfering light, and for outputting a voltage obtained by subtracting, from the aforementioned voltage, a voltage with a predetermined magnitude;

d) a polarity inverter for outputting a voltage obtained by inverting the polarity of an input voltage;

e) a bias voltage adder for adding a bias voltage with a predetermined magnitude to an input voltage;

f) an amplifier for amplifying an input voltage by a predetermined multiplying factor;

g) an analogue-to-digital converter for converting an input signal into a digital signal;

h) a first signal processor for performing a first signal-processing operation in which an output voltage from the detector is successively processed by the bias voltage adder and the amplifier;

i) a second signal processor for performing a second signal-processing operation in which an output voltage from the detector is successively processed by the polarity inverter, the bias voltage adder, and the amplifier;

j) a judging section for inputting, into the analogue-to-digital converter, each of the voltages obtained through the first signal-processing operation and the second signal-processing operation, and for making a judgment on whether or not each of the voltage falls within an input range of the analogue-to-digital converter; and k) a signal-processing determining section for determining which of the first and second signal-processing operations should be used to process an output voltage from the detector in an actual measurement, based on the result of the judgment by the judging section.

An example of the detector is a pyroelectric detector. The pyroelectric detector generates a voltage with a magnitude corresponding to the intensity of the interfering light and outputs a voltage obtained by subtracting a direct voltage with a predetermined magnitude (offset voltage) from the aforementioned voltage. Other than the pyroelectric detector, a device which outputs a voltage obtained by subtracting, from a voltage with a magnitude corresponding to the intensity of the interfering light, the direct-current (DC) component of the same voltage may also be used as the detector. For example, a mercury cadmium telluride (MCT) detector or indium gallium arsenide (InGaAs) detector can be used, both of which are quantum detectors. The DC component corresponds to the component which contains no information on the frequency components that form an absorption spectrum obtained through the Fourier transform. For example, the value of the voltage which is generated when the infrared light emitted from the light source is detected without interference can be used as the DC component. A calculated value based on the intensity of the infrared light emitted from the light source and the magnitude of the absorption of light by optical components included in the interferometer and other related sections may also be used.

The judgment by the judging section can be made by checking whether or not the output signal from the A/D converter is a saturated signal.

In Fourier transform infrared spectrophotometers, it is difficult to predict whether the highest peak in the subtracted waveform will appear on the positive voltage side or negative voltage side. However, the peak height (absolute value) is almost constant. Therefore, it is possible to determine the magnitude of the bias voltage as well as the predetermined multiplying factor mentioned earlier, from the result of a preliminary experiment or past measurement.

Figure 4A:
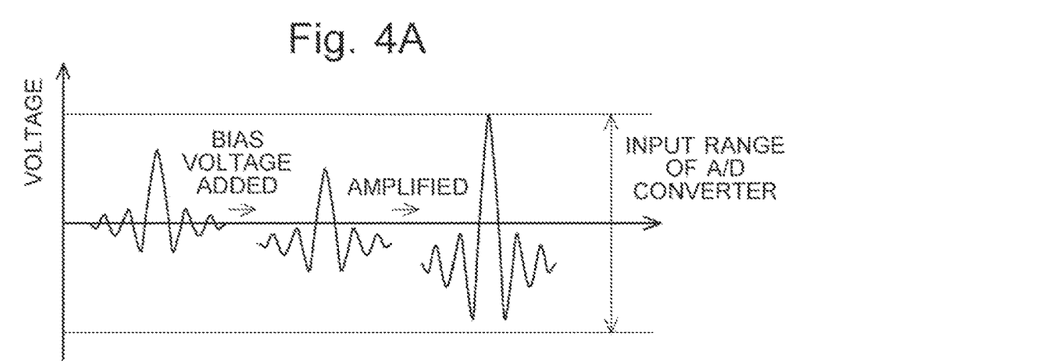
FIGS. 4A and 4B are diagrams schematically showing the signal-processing operations in the Fourier transform infrared spectrophotometer according to the first aspect of the present invention.
Figure 4B:
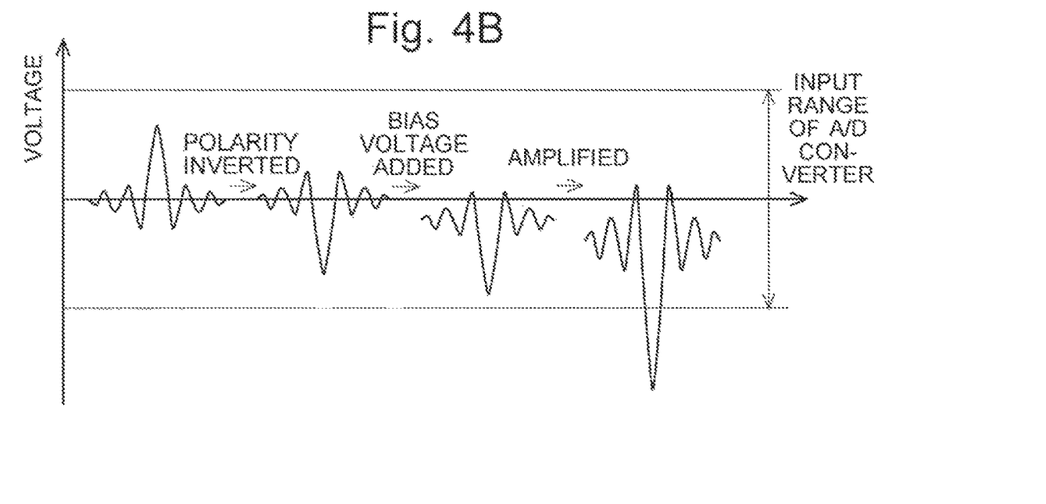

In the Fourier transform infrared spectrophotometer according to the first aspect of the present invention, the first signal-processing operation in which an output voltage from the detector is amplified after the addition of a bias voltage, and the second signal-processing operation in which the same output voltage from the detector is amplified after the inversion of its polarity and the addition of the bias voltage, are performed. For each of the voltages obtained through the two operations, whether or not the voltage is within the input range of the A/D converter is determined. For example, consider the case where the highest peak is present on the positive voltage side and the bias voltage has a negative value. In the first signal-processing operation, as shown in FIG. 4A, the voltage signal is initially shifted toward the negative side by the addition of the bias voltage. After the height of the highest peak in the subtracted waveform is thus decreased (i.e. its absolute value is decreased), the voltage signal is amplified. Since the voltage signal has been shifted by the addition of the bias voltage in such a manner as to decrease the absolute value of the highest peak, the voltage signal falls within the input range of the A/D converter even after the amplification. By comparison, in the second signal-processing operation which includes polarity inversion, as shown in FIG. 4B, the highest peak becomes even higher due to the addition of the bias voltage (i.e. its absolute value increases) and is subsequently amplified by the amplifier. Consequently, the voltage signal goes beyond the input range of the A/D converter after the amplification, and a saturation signal is outputted. Therefore, in the present case, the judging section designates the first signal-processing operation as the processing method to be used in the actual measurement. Conversely, if the highest peak of the subtracted waveform is present on the negative voltage side, the voltage signal in the first signal-processing operation goes beyond the input range of the A/D converter after the amplification, while the voltage signal in the second signal-processing operation falls within the input range of the A/D converter after the amplification. Accordingly, the second signal-processing operation is designated as the processing method to be used in the actual measurement. Thus, in the Fourier transform infrared spectrophotometer according to the first aspect of the present invention, when an actual measurement is performed, the operation of amplifying the voltage signal is performed after the subtracted waveform biased toward the positive or negative voltage side is converted into a waveform which is evenly divided on both sides by being entirely shifted in a direction which decreases the height of the highest peak. Therefore, the input range of the A/D converter can be efficiently utilized on both positive and negative voltage sides.

A Fourier transform infrared spectrophotometer according to the second aspect of the present invention includes:

a) a light source for generating infrared light having a wavelength width including an absorption wavelength of a compound to be analyzed;

b) an interferometer including a fixed mirror and a movable mirror, for generating interfering light from the infrared light;

c) a detector for generating a voltage with a magnitude corresponding to the intensity of the interfering light, and for outputting a voltage obtained by subtracting, from the aforementioned voltage, a voltage with a predetermined magnitude;

d) a bias voltage adder for adding either a predetermined positive bias voltage or a predetermined negative bias voltage to an input voltage, the two bias voltages having the same absolute value;

e) an amplifier for amplifying an input voltage by a predetermined multiplying factor;

f) an analogue-to-digital converter for converting an input signal into a digital signal;

g) a third signal processor for performing a third signal-processing operation in which an output voltage from the detector is amplified by the predetermined multiplying factor after the positive bias voltage is added to the output voltage;

h) a fourth signal processor for performing a fourth signal-processing operation in which an output voltage from the detector is amplified by the predetermined multiplying factor after the negative bias voltage is added to the output voltage;

i) a judging section for inputting, into the analogue-to-digital converter, each of the voltages obtained through the third signal-processing operation and the fourth signal-processing operation, and for making a judgment on whether or not each of the voltage falls within an input range of the analogue-to-digital converter; and j) a signal-processing determining section for determining which of the third and fourth signal-processing operations should be used to process an output voltage from the detector in an actual measurement, based on the result of the judgment by the judging section.

In the Fourier transform infrared spectrophotometer according to the second aspect of the present invention, the subtracted waveform is entirely shifted by the fourth signal-processing operation when the highest peak is present on the positive voltage side, or by the third signal-processing operation when the highest peak is present on the negative voltage side, in such a manner as to decrease the height of the peak, whereby the waveform biased toward the positive or negative voltage side is converted into a waveform which is evenly divided on both sides. Therefore, the input range of the A/D converter can be efficiently utilized on both positive and negative voltage sides, as with the Fourier transform infrared spectrophotometer according to the first aspect of the present invention.

A Fourier transform infrared spectrophotometer according to the third aspect of the present invention includes:

a) a light source for generating infrared light having a wavelength width including an absorption wavelength of a compound to be analyzed;

b) an interferometer including a fixed mirror and a movable mirror, for generating interfering light from the infrared light;

c) a detector for generating a voltage with a magnitude corresponding to the intensity of the interfering light, and for outputting a voltage obtained by subtracting, from the aforementioned voltage, a voltage with a predetermined magnitude;

d) a high-pass filter for allowing the passage of frequency components equal to or higher than a predetermined frequency in an output voltage from the detector;

e) an amplifier for amplifying an output voltage from the high-pass filter by a predetermined multiplying factor; and f) an analogue-to-digital converter for converting an output voltage from the amplifier into a digital signal.

In the Fourier transform infrared spectrophotometer according to the third aspect of the present invention, the high-pass filter allows the passage of such frequency components of the output voltage from the detector that are equal to or higher than a predetermined frequency. High-pass filters are also known as differential circuits (for example, see Patent Literature 4). In the Fourier transform infrared spectrophotometer according to the third aspect of the present invention, the predetermined frequency is set at a value near a dominant frequency in the subtracted waveform by using the high-pass filter. As a result, the subtracted waveform biased toward the positive or negative voltage side is converted by differentiation into a waveform which is almost evenly divided on both sides. Therefore, the input range of the A/D converter can be efficiently utilized on both positive and negative voltage sides.

Advantageous Effects of the Invention

By using the Fourier transform infrared spectrophotometer according to one of the first through third aspects of the present invention, the input range of the A/D converter can be efficiently used regardless of whether the highest peak with a positive voltage or one with a negative voltage appears.

DESCRIPTION OF EMBODIMENTS

Three embodiments relating to the Fourier transform infrared spectrophotometer according to the present invention are hereinafter described with reference to the attached drawings.

Figure 5:
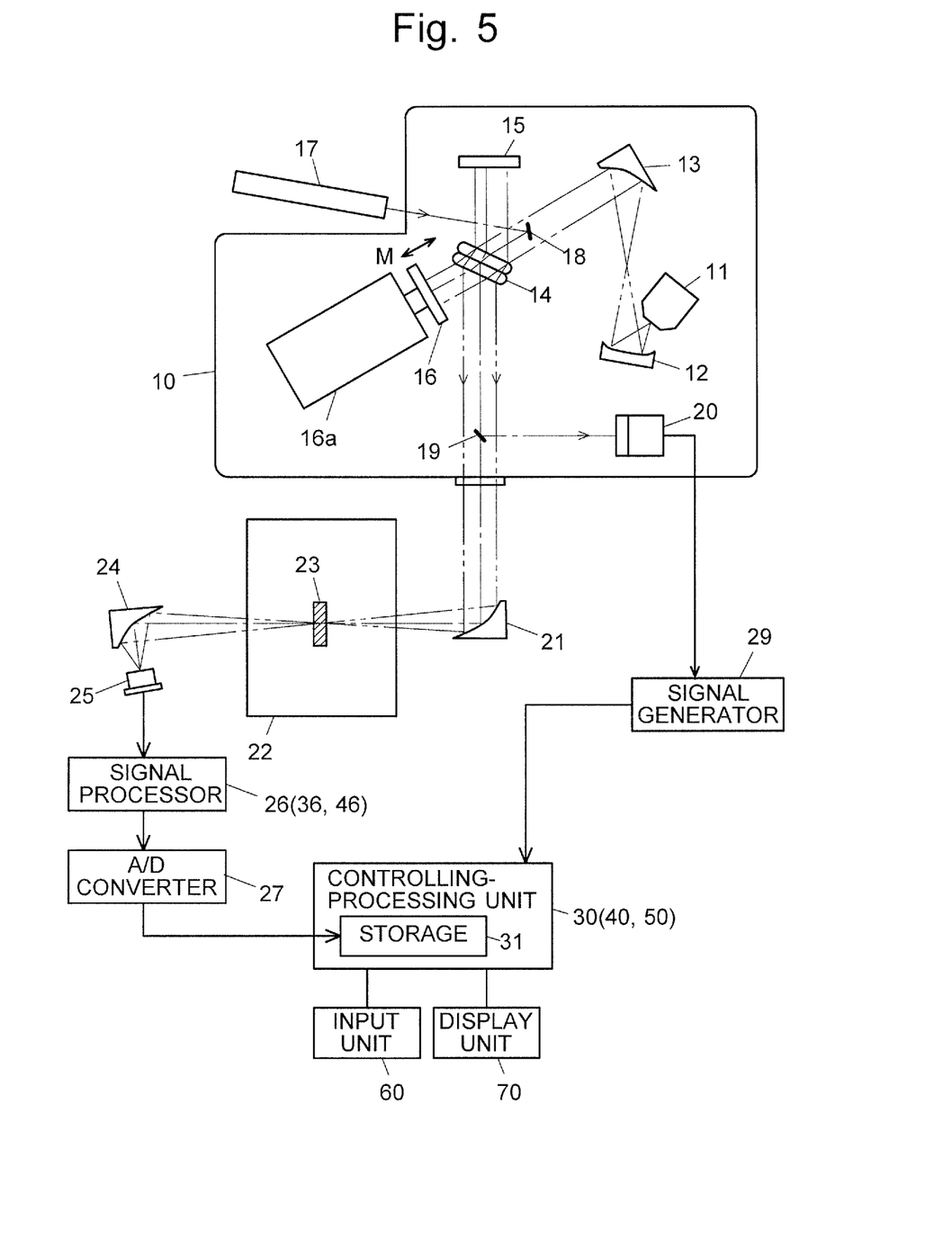
FIG. 5 is a diagram illustrating a configuration which is common to the Fourier transform infrared spectrophotometers according to the first through third embodiments.

FIG. 5 is a diagram showing the configuration which is common to the Fourier transform infrared spectrophotometers according to the first through third embodiments. The Fourier transform infrared spectrophotometer includes a main interferometer for obtaining an interferogram, and a control interferogram for controlling the sliding speed of the movable mirror as well as generating a timing signal used for the sampling of the signals obtained with the detector in the main interferometer. The main interferometer includes a light source 11, condensing mirror 12, collimating mirror 13, beam splitter 14, fixed mirror 15 and movable mirror 16. This interferometer generates interfering infrared light used for performing a spectral measurement. Infrared light emitted from the light source 11 is cast onto the beam splitter 14 via the condensing mirror 12 and the collimating mirror 13. The beam splitter 14 splits the light into two beams travelling toward the fixed and movable mirrors 15 and 16, respectively. The beams respectively reflected by the fixed and movable mirrors 15 and 16 once more meet at the beam splitter 14 and are thereby merged into a single beam. This beam is sent into an optical path leading to a parabolic mirror 21. Meanwhile, the movable mirror 16 is driven back and forth (in the direction indicated by arrow M in FIG. 5) by a movable mirror driver 16a. Therefore, the combined beam becomes interfering light whose intensity temporally changes. This light is condensed by the parabolic mirror 21 and cast into a sample chamber 22. After passing through a sample 23 inside the sample chamber 22, the light is focused onto a detector 25 by an ellipsoidal mirror 24.

The control interferometer includes a laser source 17, mirror 18, (aforementioned) beam splitter 14, (aforementioned) mirror 15 and (aforementioned) movable mirror 16. This interferometer generates interfering laser light for obtaining an interference fringe signal. The light emitted from the laser source 17 is cast onto the beam splitter 14 via the mirror 18 and becomes interfering light, as with the infrared light, which travels toward the parabolic mirror 21. This interfering laser light travels in the form of an extremely thin flux of light. This light is reflected by a mirror 19 placed in the optical path leading to the parabolic mirror 21. The reflected light enters a detector 20.

The optical components constituting the main interferometer and the control interferometer are placed within an airtight chamber 10. The humidity within this chamber 10 is controlled. This is primarily aimed at protecting the beam splitter 14 and other optical elements whose substrates are made of potassium bromide (KBr), which is a deliquescent substance.

The light-receiving signal from the detector 20, i.e. the interference fringe signal, is sent to a signal generator 29, which generates a pulsed signal used for performing the sampling of the light-receiving signal corresponding to the interfering infrared light. The laser-light interference fringe signal is also used for the slide control of the movable mirror 16.

After passing through the sample 23 inside the sample chamber 22, the interfering light is condensed by the ellipsoidal mirror 24 and detected by the detector 25. The detector 25 in the present embodiment is a pyroelectric detector having a pyroelectric element and junction field-effect transistor. This detector produces an output voltage having a positive or negative value which corresponds to the difference between the offset voltage of the junction field-effect transistor and the voltage corresponding to the amount of electric charges generated by the pyroelectric element according to the intensity of the infrared light.

The light-receiving signal obtained in the detector 25 is processed by a signal processor 26 (36 or 46) in a characteristic manner as will be described later in the embodiments. The processed signal is converted into a digital signal by an analogue-to-digital (A/D) converter 27 and sent to a controlling-processing unit 30 (40 or 50). In the controlling-processing unit 30 (40 or 50), after a predetermined data-processing operation is carried out, a Fourier transform computation is performed to create an absorption spectrum.

The controlling-processing unit 30 (40 or 50) may be constructed as a dedicated controlling-processing device equipped with a storage section 31. However, typically, this unit is actually a personal computer on which a dedicated controlling-processing software program is installed. An input unit 60 for allowing users to perform various input operations with a keyboard and pointing device (e.g. mouse), as well as a display unit 70, such as a liquid crystal display, for displaying measured results and other related information, are connected to the unit.

First Embodiment

Figure 6:
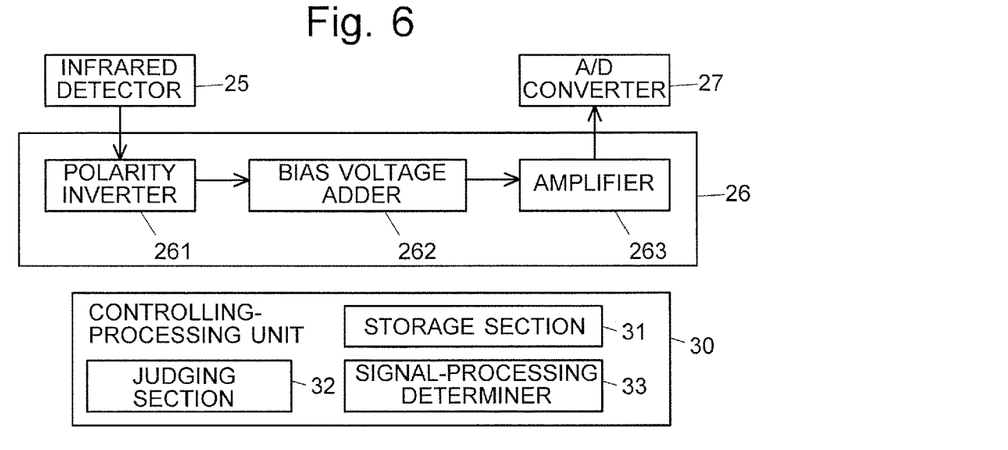
FIG. 6 is a diagram illustrating the configuration of a signal processor and a controlling-processing unit used in the Fourier transform infrared spectrophotometer according to the first embodiment.

FIG. 6 shows the configuration of the signal processor 26 and the controlling-processing unit 30 used in the Fourier transform infrared spectrophotometer according to the first embodiment. The signal processor 26 in the first embodiment includes: a polarity inverter 261 for outputting a voltage obtained by inverting the polarity of an input voltage; a bias voltage adder 262 for adding a bias voltage with a predetermined magnitude to an input voltage; and an amplifier 263 for amplifying an input voltage by a predetermined multiplying factor. The polarity inverter 261, bias voltage adder 262 and amplifier 263 each actually consist of electric circuits, in which the function of each component (which will be described later) is realized by an appropriate combination of various kinds of conventionally known electric circuits. The controlling-processing unit 30 includes a judging section 32 and a signal-processing determining section 33 as its functional blocks in addition to the storage section 31. For example, those functional blocks are embodied by running a predetermined program previously installed on a computer used as the controlling-processing unit 30.

In the Fourier transform infrared spectrophotometer according to the first embodiment, a preliminary measurement for determining the signal-processing method to be used in a measurement of a real sample is performed in advance of the measurement. For example, the preliminary measurement is performed by the controlling-processing unit 30 by operating each section of the Fourier transform infrared spectrophotometer, based on a command issued by a user through the input unit 60. It is also possible to configure the controlling-processing unit 30 to automatically perform the preliminary measurement when the Fourier transform infrared spectrometer is energized, or when a period of time equal to or longer than a predetermined length of time has passed since the previous measurement of a real sample.

In the preliminary measurement, while the position of the movable mirror 16 is gradually changed, the intensity of the interfering infrared light incident on the detector 25 is sequentially measured. The preliminary measurement is performed two times; the first signal-processing operation is performed in the first measurement, and the second signal-processing operation is performed in the second measurement.

In the first signal-processing operation performed in the first preliminary measurement, the polarity inverter 261 does not invert the polarity of the output voltage received from the detector 25 but directly sends the voltage to the bias voltage adder 262 without inverting the polarity of the voltage. Alternatively, a signal-routing switch may be provided in front of the polarity inverter 261, and this switch may be used to directly send the voltage to the bias voltage adder 262, bypassing the polarity inverter 261. The bias voltage adder 262 adds a predetermined bias voltage to the sequentially inputted voltage and outputs the obtained voltage. The voltage obtained by the addition of the bias voltage is amplified by a predetermined multiplying factor in the amplifier 263 and outputted. The output voltage from the amplifier 263 is converted into a digital signal by the A/D converter 27 and stored in the storage section 31 in the controlling-processing unit 30.

In the second signal-processing operation performed in the second preliminary measurement, the polarity inverter 261 inverts the polarity of the output voltage received from the detector 25 and sends the voltage to the bias voltage adder 262. The bias voltage adder 262 adds a predetermined bias voltage to the sequentially inputted voltage with the inverted polarity and outputs the obtained voltage. The voltage obtained by the addition of the bias voltage is amplified by a predetermined multiplying factor in the amplifier 263 and outputted. The output voltage from the amplifier 263 is converted into a digital signal by the A/D converter 27 and stored in the storage section 31 in the controlling-processing unit 30. Thus, the first and second signal-processing operations differ from each other as to whether or not the inversion of the polarity of the output voltage from the detector 25 is performed.

Figure 7A:
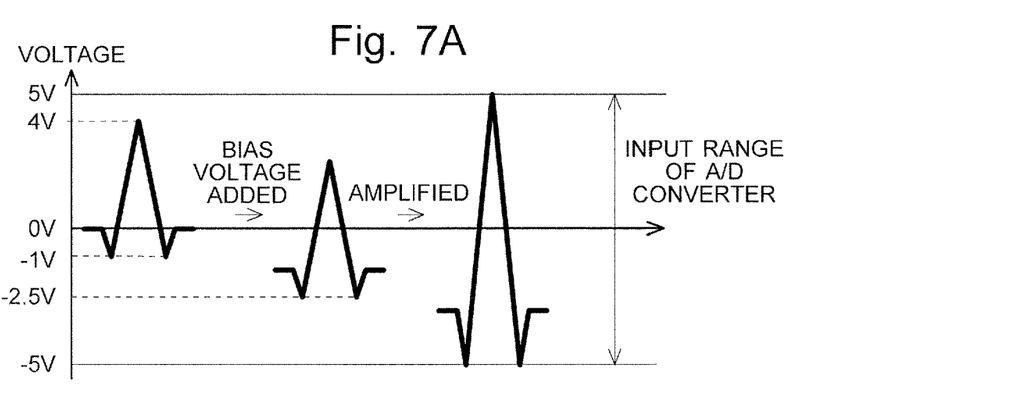
FIGS. 7A and 7B are diagrams showing the flow of the signal-processing operations in the Fourier transform infrared spectrophotometer according to the first embodiment.
Figure 7B:
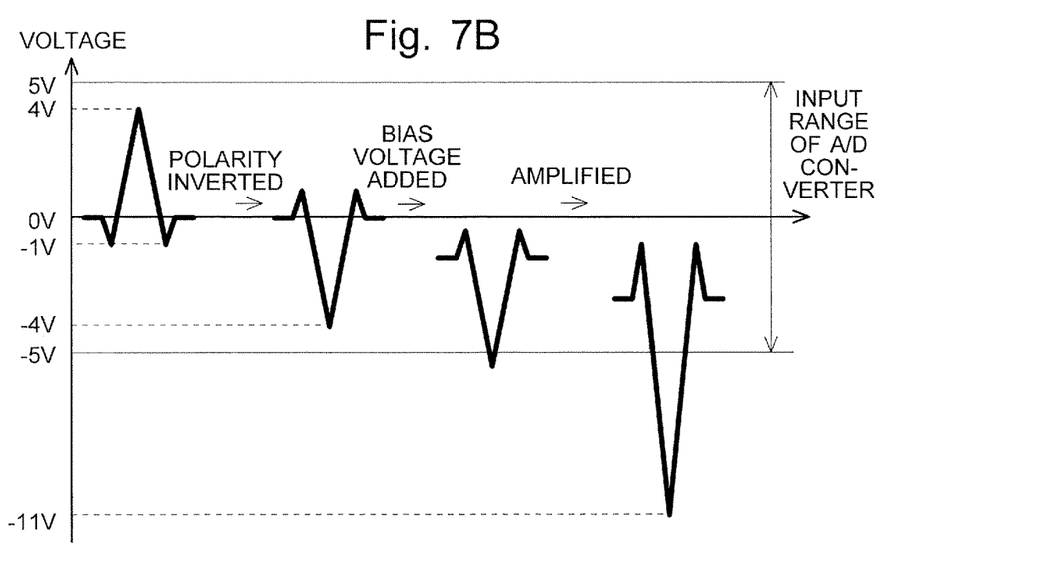

FIGS. 7A and 7B illustrate one example of a specific signal-processing operation, using a model of the subtracted waveform. In FIGS. 7A and 7B, the waveform is simplified for easier understanding of the feature of the signal-processing operation in the first embodiment. Subtracted waveforms obtained by actual measurements are more complex. The same also applies to the waveforms used for the explanation in the second and third embodiments. For the following description, it is assumed that the subtracted waveform outputted from the detector 25 has the highest peak with an absolute voltage value of 4 V, and the largest output voltage on the opposite side to the polarity of the highest peak is 1 V. Based on this assumption, the bias voltage is set at −1.5 V, and the amplification factor is set at two. The input range of the A/D converter 27 is from −5 V to +5 V. It is impossible to predict whether the highest peak which appears on an interferogram (FIG. 1) obtained with a Fourier transform infrared spectrophotometer will be pointed upward or downward (in other words, whether the highest peak will appear on the positive voltage side or on the negative voltage side in the subtracted waveform as shown in FIG. 3). However, since the magnitude of the highest peak (absolute voltage value) is almost constant, it is possible to previously estimate the range of the voltage which forms the subtracted waveform. Accordingly, based on this voltage range and the input range of the A/D converter 27, the magnitude of the bias voltage and the amplification factor can be determined beforehand.

Consider the case where the highest peak of the subtracted waveform appears on the positive voltage side (i.e. the range of the output voltage of the subtracted waveform is from −1 V to +4 V). In the first signal-processing operation, the subtracted waveform is processed as shown in FIG. 7A. The resulting output voltage of the amplifier 263 ranges from −5 V to +5 V, which falls within the input range of the A/D converter 27. By comparison, in the second signal-processing operation, the subtracted waveform is processed as shown in FIG. 7B. The resulting output voltage of the amplifier 263 ranges from −11 V to −1 V, which goes beyond the input range of the A/D converter 27. Upon receiving such an input voltage, the A/D converter 27 outputs a saturation signal, and this signal is stored in the storage section 31. Therefore, for each of the output voltages obtained through the first and second signal-processing operations, the judging section 32 can determine whether or not the output voltage is within the input range of the A/D converter 27, by checking whether nor not the corresponding signal stored in the storage 31 is saturated. After the determination by the judgement section 32, the signal-processing determining section 33 designates either the first or second signal-processing operation which has yielded the voltage that falls within the input range of the A/D converter 27 as the signal-processing method to be used in the actual measurement.

Although the description thus far has been concerned with the case where the highest peak of the subtracted waveform appears on the positive voltage side, the case where the highest peak appears on the negative voltage side can also be similarly handled. In that case, the signal-processing determining section 33 designates the second signal-processing operation as the signal-processing method to be used in the actual measurement. In addition, the positive voltage used as the bias voltage in the previously described example may be replaced by a positive voltage having the same absolute value.

Second Embodiment

Figure 8:
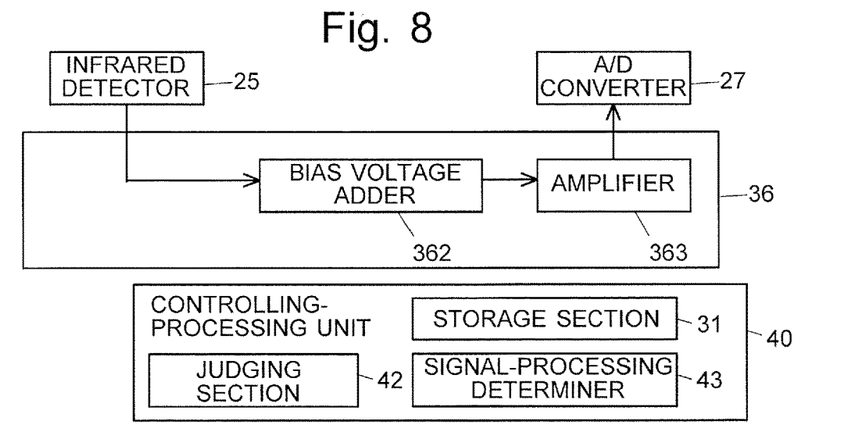
FIG. 8 is a diagram illustrating the configuration of a signal processor and a controlling-processing unit used in the Fourier transform infrared spectrophotometer according to the second embodiment.

FIG. 8 shows the configuration of the signal processor 36 and the controlling-processing unit 40 used in the Fourier transform infrared spectrophotometer according to the second embodiment. The signal processor 36 in the second embodiment includes: a bias voltage adder 362 for adding either a positive bias voltage or negative bias voltage to an input voltage, the two bias voltages having the same absolute value; and an amplifier 363 for amplifying an input voltage by a predetermined multiplying factor. The bias voltage adder 362 and amplifier 363 each actually consist of electric circuits, in which the function of each component (which will be described later) is realized by an appropriate combination of various kinds of conventionally known electric circuits. Similar to the controlling-processing unit 30 in the first embodiment, the controlling-processing unit 40 includes a judging section 42 and a signal-processing determining section 43 as its functional blocks in addition to the storage section 31. For example, those functional blocks are embodied by running a predetermined program previously installed on a computer used as the controlling-processing unit 40.

As with the first embodiment, in the Fourier transform infrared spectrophotometer according to the second embodiment, a preliminary measurement for determining the signal-processing method to be used in a measurement of a real sample is performed in advance of the measurement. For example, the preliminary measurement is performed by the controlling-processing unit 40 by operating each section of the Fourier transform infrared spectrophotometer, based on a command issued by a user through the input unit 60. It is also possible to configure the controlling-processing unit 40 to automatically perform the preliminary measurement when the Fourier transform infrared spectrometer is energized, or when a period of time equal to or longer than a predetermined length of time has passed since the previous measurement of a real sample.

In the preliminary measurement, while the position of the movable mirror 16 is gradually changed, the intensity of the interfering infrared light incident on the detector 25 is sequentially measured. The preliminary measurement is performed two times; the third signal-processing operation is performed in the first measurement, and the fourth signal-processing operation is performed in the second measurement.

In the third signal-processing operation performed in the first preliminary measurement, the bias voltage adder 362 adds a positive bias voltage to the voltage sequentially produced by the detector 25 and outputs the obtained voltage. The voltage obtained by the addition of the positive bias voltage is amplified by a predetermined multiplying factor in the amplifier 363 and outputted. The output voltage from the amplifier 363 is converted into a digital signal by the A/D converter 27 and stored in the storage section 31 in the controlling-processing unit 40.

In the fourth signal-processing operation performed in the second preliminary measurement, the bias voltage adder 362 adds a negative bias voltage having the same absolute value as the aforementioned positive bias voltage to the voltage sequentially produced by the detector 25 and outputs the obtained voltage. The voltage obtained by the addition of the negative bias voltage is amplified by a predetermined multiplying factor in the amplifier 363 and outputted. The output voltage from the amplifier 363 is converted into a digital signal by the A/D converter 27 and stored in the storage section 31 in the controlling-processing unit 40. Thus, the third and fourth signal-processing operations differ from each other in the polarity of the bias voltage added to the output voltage of the detector 25 in the bias voltage adder 362.

Figure 9A:
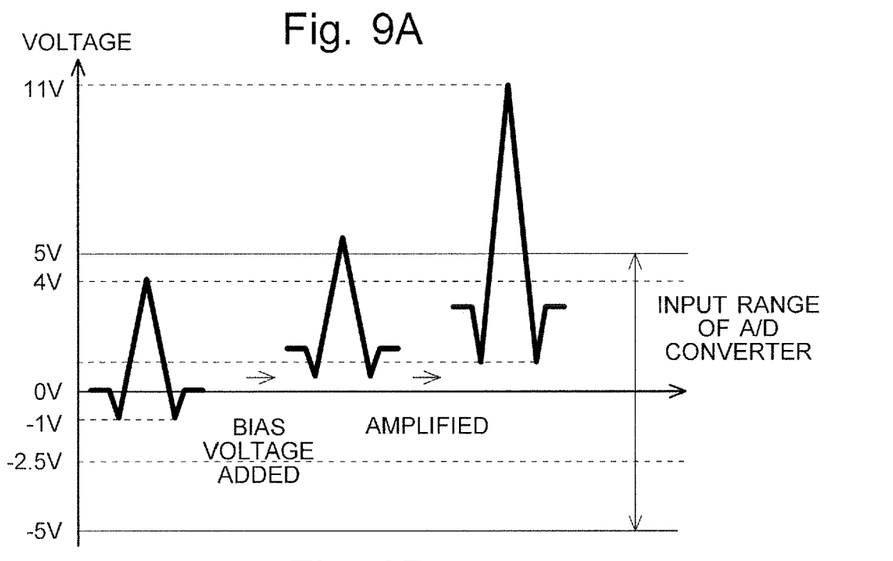
FIGS. 9A and 9B are diagrams showing the flow of the signal-processing operations in the Fourier transform infrared spectrophotometer according to the second embodiment.
Figure 9B:
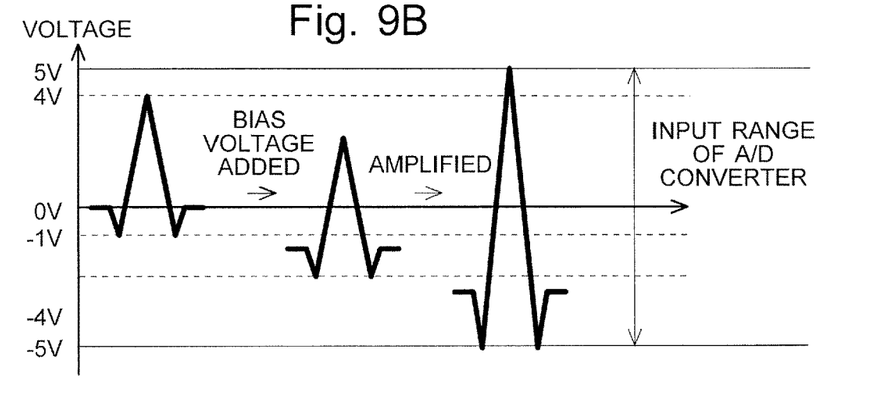

FIGS. 9A and 9B illustrate one example of a specific signal-processing operation, using a model of the subtracted waveform. Similar to FIGS. 7A and 7B, it is assumed that the subtracted waveform outputted from the detector 25 has the highest peak with an absolute voltage value of 4 V, and the largest output voltage on the opposite side to the polarity of the highest peak is 1 V. Based on this assumption, the bias voltage is set at ±1.5 V, and the amplification factor is set at two. The input range of the A/D converter 27 is from −5 V to +5 V. As already explained in the first embodiment, it is impossible to predict whether the highest peak will appear on the positive voltage side or on the negative voltage side in the subtracted waveform. However, since the magnitude of the highest peak (absolute voltage value) is almost constant, it is possible to previously estimate the range of the voltage which forms the subtracted waveform and determine the magnitude of the bias voltage (absolute value). Based on this voltage range and the input range of the A/D converter 27, the magnitude of the bias voltage (absolute value) can be determined beforehand.

Consider the case where the highest peak of the subtracted waveform appears on the positive voltage side (i.e. the range of the output voltage of the subtracted waveform is from −1 V to +4 V). In the third signal-processing operation, the subtracted waveform is processed as shown in FIG. 9A. The resulting output voltage of the amplifier 363 ranges from +1 V to +11 V, which goes beyond the input range of the A/D converter 27. By comparison, in the fourth signal-processing operation, the subtracted waveform is processed as shown in FIG. 9B. The resulting output voltage from the amplifier 363 ranges from −5 V to +5 V, which falls within the input range of the A/D converter 27. Therefore, for each of the output voltages obtained through the third and fourth signal-processing operations, the judging section 42 can determine whether or not the output voltage is within the input range of the A/D converter 27, by checking whether nor not the corresponding signal stored in the storage 31 is saturated. After the determination by the judgement section 42, the signal-processing determining section 43 designates either the third or fourth signal-processing operation which has yielded the voltage that falls within the input range of the A/D converter 27 as the signal-processing method to be used in the actual measurement.

Once again, although the description thus far has been concerned with the case where the highest peak of the subtracted waveform appears on the positive voltage side, the case where the highest peak appears on the negative voltage side can also be similarly handled. In that case, the signal-processing determining section 43 designates the third signal-processing operation as the signal-processing method to be used in the actual measurement.

Third Embodiment

Figure 10:
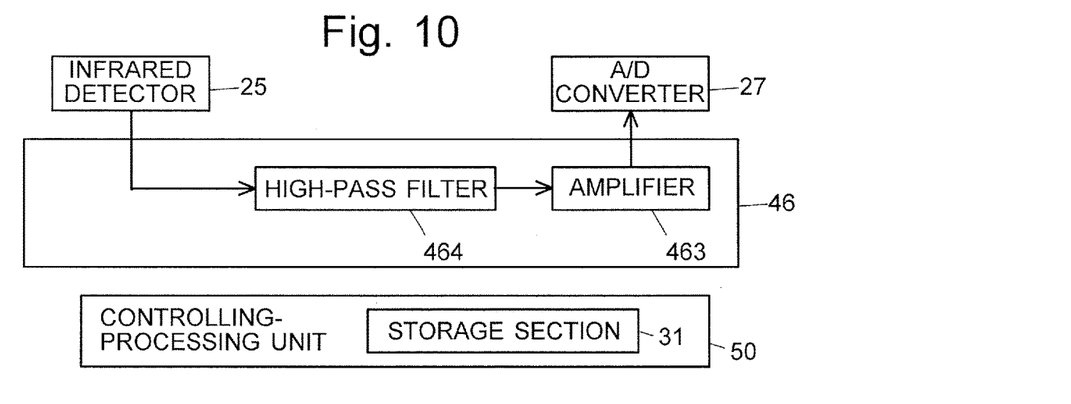
FIG. 10 is a diagram illustrating the configuration of a signal processor and a controlling-processing unit used in the Fourier transform infrared spectrophotometer according to the third embodiment.

FIG. 10 shows the configuration of the signal processor 46 and the controlling-processing unit 50 used in the Fourier transform infrared spectrophotometer according to the third embodiment. The signal processor 46 in the third embodiment includes: a high-pass filter (HPF) 464 for allowing the passage of only such frequency components of an input voltage signal that are equal to or higher than a predetermined frequency; and an amplifier 463 for amplifying an input voltage by a predetermined multiplying factor. The high-pass filter 464 and amplifier 463 each actually consist of electric circuits, in which the function of each component (which will be described later) is realized by an appropriate combination of various kinds of conventionally known electric circuits. As with the controlling-processing unit 30 in the first embodiment or the controlling-processing unit 40 in the second embodiment, the controlling-processing unit 50 has a storage section 31. However, this unit has neither the judging section nor the signal-processing determining section.

Unlike the first or second embodiment, no preliminary measurement is performed in the Fourier transform infrared spectrophotometer according to the third embodiment. Therefore, for example, after the device has been energized and necessary tasks (such as the optical path adjustment) have been performed, an actual measurement can be immediately performed. Needless to say, a preliminary measurement may be performed if it is necessary in order to determine the range of the frequency components to be allowed to pass through the high-pass filter 464, amplification factor, or input range of the A/D converter.

Figure 11:
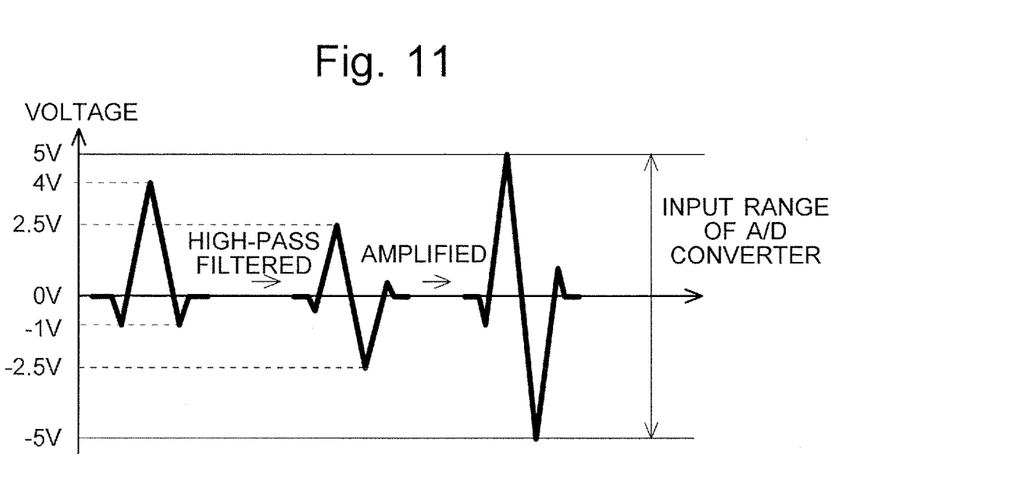
FIG. 11 is a diagram showing the flow of the signal-processing operations in the Fourier transform infrared spectrophotometer according to the third embodiment.

FIG. 11 illustrates one example of a specific signal-processing operation, using a model of the subtracted waveform. Similar to FIGS. 7 and 9, it is assumed that the subtracted waveform outputted from the detector 25 has the highest peak with an absolute voltage value of 4 V, and the largest output voltage on the opposite side to the polarity of the highest peak is 1 V. Based on this assumption, the amplification factor is set at two. The input range of the A/D converter 27 is from −5 V to +5 V.

In the Fourier transform infrared spectrophotometer according to the third embodiment, the high-pass filter 464 is used to allow such frequency components of the output voltage from the detector that are equal to or higher than a predetermined frequency. The "predetermined" frequency may preferably be set at a value near the principal frequency in the subtracted waveform (or interferogram). This value depends on the wavelength at which a high-intensity emission is observed in the emission spectrum of the light source as well as the configuration of the optical system including the interferometer. The principal frequency in the subtracted waveform is determined by the speed of the movable mirror 16 and the wavelength of the infrared light. The wavelength of the infrared light is the wavelength of light absorbed by the target compound contained in the sample. Accordingly, a light source having a high emission intensity at that wavelength is used as the light source 11. For example, when the speed of the movable mirror 16 is 2.8 mm/s and the measurement wavelength is 2000 cm$^{-1}$ (in terms of wavenumber), the frequency is f=2×2.8 (mm/s)×2000 (cm$^{-1}$) =1120 Hz. This means that a frequency range around 1 kHz will be dominant. Therefore, the cutoff frequency of the high-pass filter 464 may preferably be set in the vicinity of 1 kHz.

The high-pass filter 464 is also known as a differential circuit. In the Fourier transform infrared spectrophotometer according to the third embodiment, the subtracted waveform is differentiated by being passed through this high-pass filter 464. The waveform obtained by this difference is amplified by the amplifier 463 and subsequently converted into a digital signal by the A/D converter 27.

Figure 12:
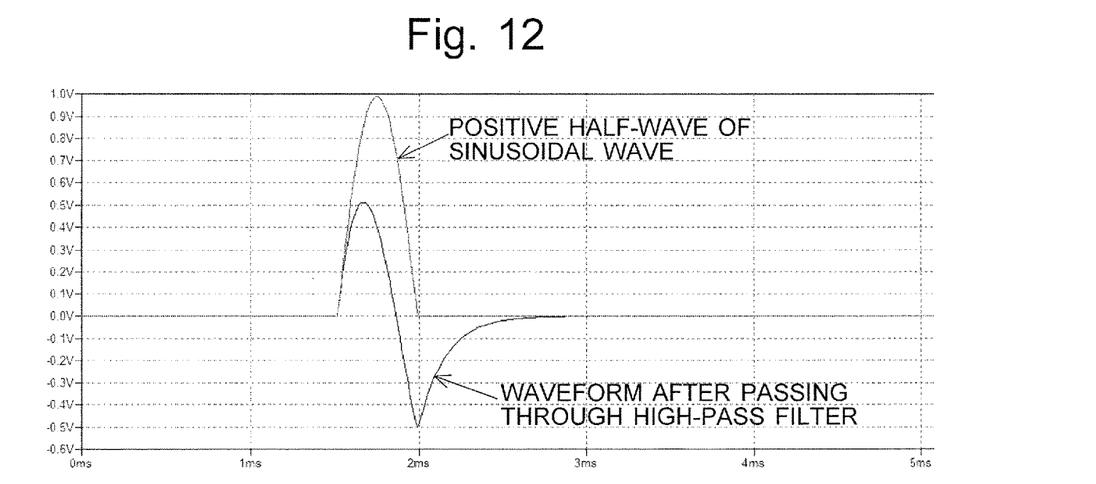
FIG. 12 is a simulated waveform obtained by passing a positive half-wave of a 1-kHz sinusoidal wave through a 1-kHz high-pass filter.

In most cases, signal frequencies in commonly used analyzing devices are lower than noise frequencies. Accordingly, it is rare to use a filter within a frequency band of the measurement signal. However, in the case of Fourier transform infrared spectrophotometer, the band of the signal frequency almost coincides with that of the noise frequency as a result of the Fourier transform of the data obtained through the measurement. Therefore, the high-pass filter is used in the vicinity of the principal frequency band of the measurement signal. For example, if a 1-kHz high-pass filter is used for a 1-kHz measurement signal, the measurement signal and noise are both decreased to 1/√2. However, the same filter also produces the effect that the waveform of the highest peak which is biased toward the positive or negative voltage side is converted into a waveform which is evenly (symmetrically) divided on both sides. This allows the amplification factor of the amplifier 463 to be doubled without requiring a change in the input range of the A/D converter 27. FIG. 12 shows a simulated waveform obtained by passing a positive half-wave of a 1-kHz sinusoidal wave through a 1-kHz high-pass filter.

In any of the first through third embodiments, the subtracted waveform biased toward the positive or negative voltage side is converted into a waveform which is (almost) evenly divided on both sides by the characteristic signal-processing operation of each embodiment. Therefore, unlike the conventional case, the input range of the A/D converter can be fully utilized without leaving a considerable portion of the input range unused on either the positive or negative voltage side on which the highest peak of the subtracted waveform does not appear. That is to say, the entire input range of the A/D converter can be efficiently used, and the bits of the input range can be maximally utilized, so that the measurement data can be acquired with a high level of resolving power.

The conventional Fourier transform infrared spectrophotometer, the Fourier transform infrared spectrophotometers according to the first and second embodiments, and the Fourier transform infrared spectrophotometer according to the third embodiment are hereinafter compared in terms of the signal-to-noise (SN) ratio of a measurement signal obtained in each device. The conditions of the calculation are as follows: The signal has an SN ratio of one at the point of input into the signal processor in each device. As in the first through third embodiments, the subtracted waveform inputted into the signal processor has the highest peak with a peak voltage (absolute value) of 4 V (i.e. +4 V or −4 V). The input range of the A/D converter is from −5 V to +5 V.

In the case of the conventional Fourier transform infrared spectrophotometer, the amplification factor by the amplifier is set at 1.25 so that the highest peak will certainly fall within the input range of the A/D converter (from −5 V to +5 V) regardless of whether the peak (with an absolute value of 4 V) appears on the positive voltage side or on the negative voltage side. In the case of the first and second embodiments, the amplification factor of the signal in the amplifier 263 (363) is set at two. In the case of the third embodiment, the signal and noise are both decreased to $1/\sqrt{2}$ (=0.71) at the point of exit from the high-pass filter 464 and are subsequently multiplied by two by the amplifier 463. Based on these numerical values, the SN ratio of the signal after the A/D conversion in each of the three cases has been calculated as shown in the following table.

TABLE 1

| | At Input | After Passage through HPF | After Amplification | After A/D Conversion |
|---|---|---|---|---|
| Conventional | $\frac{S}{N} = \frac{1}{1}$ | | $\frac{S}{N} = \frac{1.25}{1.25}$ | $\frac{S}{N} = \frac{1.25}{1.25 + Vn(AD)}$ |
| Embodiments 1 and 2 | $\frac{S}{N} = \frac{1}{1}$ | | $\frac{S}{N} = \frac{2}{2}$ | $\frac{S}{N} = \frac{2}{2 + Vn(AD)}$ |
| Embodiment 3 | $\frac{S}{N} = \frac{1}{1}$ | $\frac{S}{N} = \frac{0.71}{0.71}$ | $\frac{S}{N} = \frac{1.42}{1.42}$ | $\frac{S}{N} = \frac{1.42}{1.42 + Vn(AD)}$ |

In the above table, Vn(A/D) represents characteristic noise of the A/D converter. This term is common to all of the Fourier transform infrared spectrophotometers of the conventional example and the first through third embodiments. Accordingly, it can be understood from the above table that the Fourier transform infrared spectrophotometers in the first and second embodiments have the highest SN ratio after the A/D conversion, followed by the third embodiment, and further by the conventional example. Thus, the Fourier transform infrared spectrophotometers according to the first and second embodiments can yield measurement data with a higher SN ratio than the Fourier transform infrared spectrophotometer according to the third embodiment. On the other hand, the Fourier transform infrared spectrometer according to the third embodiment has the advantage that it can be more easily constructed than the devices of the first and second embodiments, since the Fourier transform infrared spectrometers according to the first and second embodiments require the designing and addition of the circuits for the polarity conversion or the addition of bias voltage, whereas the Fourier transform infrared spectrometers according to the third embodiment utilizes the conventionally employed high-pass filter. Furthermore, the Fourier transform infrared spectrometers according to the third embodiment allows for the simplification of the measurement procedure, since it does not require preliminary measurements for determining the signal-processing method before the measurement of an actual sample.

The previously described embodiments are mere examples and can be appropriately changed within the spirit of the present invention. The configuration of the Fourier transform infrared spectrophotometer shown in FIG. 5 as the common configuration to the first through third embodiments is a mere example. The signal-processing methods described in the first through third embodiments can be applied in various other devices which can similarly perform Fourier transform infrared spectrometry.

In the first and second embodiment, one subtracted waveform is initially obtained by performing the first (or third) signal-processing operation while gradually changing the position of the movable mirror 16, and another subtracted waveform is subsequently obtained by performing the second (or fourth) signal-processing operation while once more gradually changing the position of the movable mirror 16. It is also possible to successively perform the first (third) signal-processing operation and the second (fourth) signal-processing operation at each position of the movable mirror 16 while sequentially changing the position of the movable mirror 16.

REFERENCE SIGNS LIST

10 . . . Airtight Chamber
11 . . . Light Source
12 . . . Condensing Mirror
13 . . . Collimating Mirror
14 . . . Beam Splitter
15 . . . Fixed Mirror
16 . . . Movable Mirror
16a . . . Movable Mirror Driver
17 . . . Laser Source
18, 19 . . . Mirror
20 . . . Detector
21 . . . Parabolic Mirror
22 . . . Sample Chamber
23 . . . Sample
24 . . . Ellipsoidal Mirror
25 . . . Detector
26, 36, 46 . . . Signal Processor
261 . . . Polarity Inverter
262, 362 . . . Bias Voltage Adder
263, 363, 463 . . . Amplifier
464 . . . High-Pass Filter
27 . . . A/D Converter
29 . . . Signal Generator
30, 40, 50 . . . Controlling-Processing Unit
31 . . . Storage Section
32, 42 . . . Judging Section
33, 43 . . . Signal-Processing Determining Section
60 . . . Input Unit
70 . . . Display Unit

The invention claimed is:

1. A Fourier transform infrared spectrophotometer, comprising:
   a) a light source configured to generate infrared light having a wavelength width including an absorption wavelength of a compound to be analyzed;
   b) an interferometer including a fixed mirror and a movable mirror, configured to generate interfering light from the infrared light;
   c) a detector configured to generate a voltage with a magnitude corresponding to an intensity of the interfering light, and to output a voltage obtained by subtracting, from the aforementioned voltage, a voltage with a predetermined magnitude;
   d) a differential circuit configured to differentiate the output voltage from the detector by allowing a passage of frequency components equal to or higher than a predetermined frequency in the output voltage;
   e) an amplifier configured to amplify the output voltage from the differential circuit by a predetermined multiplying factor; and
   f) an analogue-to-digital converter configured to convert the output voltage from the amplifier into a digital signal.

2. A Fourier transform infrared spectrophotometer, comprising:
   a) a light source configured to generate infrared light having a wavelength width including an absorption wavelength of a compound to be analyzed, b) an interferometer including a fixed mirror and a movable mirror, configured to generate interfering light from the infrared light;
c) a detector configured to generate a voltage with a magnitude corresponding to an intensity of the interfering light, and to output a voltage obtained by subtracting, from the aforementioned voltage, a voltage with a predetermined magnitude;
d) a polarity inverter configured to invert a voltage obtained by inverting a polarity of an input voltage;
e) a bias voltage adder configured to add a bias voltage with a predetermined magnitude to an input voltage;
f) an amplifier configured to amplify voltage by a predetermined multiplying factor;
g) an analogue-to-digital converter configured to convert an input signal into a digital signal;
h) a first signal processor configured to perform a first signal-processing operation in which an output voltage from the detector is successively processed by the bias voltage adder and the amplifier;
i) a second signal processor configured to perform a second signal-processing operation in which an output voltage from the detector is successively processed by the polarity inverter, the bias voltage adder, and the amplifier;
j) a judging section configured to input, into the analogue-to-digital converter, each of the voltages obtained through the first signal-processing operation and the second signal-processing operation, and configured to make a judgment on whether each of the voltage falls within an input range of the analogue-to-digital converter; and
k) a signal-processing determining section configured to determine which of the first and second signal-processing operations should be used to process an output voltage from the detector in an actual measurement, based on a result of the judgment by the judging section.

3. A Fourier transform infrared spectrophotometer, comprising:

a) a light source configured to generate infrared light having a wavelength width including an absorption wavelength of a compound to be analyzed;
b) an interferometer including a fixed mirror and a movable mirror, configured to generate interfering light from the infrared light;
c) a detector configured to generate a voltage with a magnitude corresponding to an intensity of the interfering light, and configured to output a voltage obtained by subtracting, from the aforementioned voltage, a voltage with a predetermined magnitude;
d) a bias voltage adder configured to add either a predetermined positive bias voltage or a predetermined negative bias voltage to an input voltage, the two bias voltages having a same absolute value;
e) an amplifier configured to amplify an input voltage by a predetermined multiplying factor;
f) an analogue-to-digital converter configured to convert an input signal into a digital signal;
g) a first signal processor configured to perform a first signal-processing operation in which the output voltage from the detector is amplified by the predetermined multiplying factor after the positive bias voltage is added to the output voltage;
h) a second signal processor configured to perform a second signal-processing operation in which an output voltage from the detector is amplified by the predetermined multiplying factor after the negative bias voltage is added to the output voltage;
i) a judging section configured to input, into the analogue-to-digital converter, each of the voltages obtained through the first signal-processing operation and the second signal-processing operation, and configured to determine whether each of the voltage falls within an input range of the analogue-to-digital converter; and
j) a signal-processing determining section configured to determine which of the first and second signal-processing operations should be used to process the output voltage from the detector in an actual measurement, based on a result of the judgment by the judging section.

* * * * *